3,408,320
TRANSPARENT ETHYLENE-PROPYLENE-DIENE
TERPOLYMER RUBBER VULCANIZATE
William F. Brucksch, North Caldwell, N.J., assignor to
Uniroyal, Inc., a corporation of New Jersey
No Drawing. Filed Apr. 21, 1965, Ser. No. 449,875
12 Claims. (Cl. 260—23.5)

ABSTRACT OF THE DISCLOSURE

Transparent vulcanizates are made by peroxide cure of silica-filled ethylene-propylene-diene terpolymer rubber in admixture with one or more of the following additives: zinc salts of carboxylic acids, alkanolamines, polycarboxylic acids, epoxidized soybean or castor oil, epoxidized polybutadiene, hydroxyl terminated polybutadiene, glycols, and polyoxyethylene compounds.

---

This invention relates to a transparent composition comprising an elastomer which is a terpolymer of two different monoolefins, usually ethylene and propylene, and a nonconjugated diene, hereinafter referred to as "EPRD." More particularly the invention relates to an elastomeric composition having a high level of light transmission, comprising EPRD, silica filler, and certain additives, cured with a peroxidic curative.

EPRD, in the gum elastomer state, is low in strength yet high in light transmission properties, i.e. low in color and high in optical clarity. However, when a silica filler is added to enhance the strength properties of EPRD, discoloration and turbidity result. The purpose of this invention, therefore, is to ameliorate the deleterious effects caused by the addition of silica filler to the EPRD.

The light transmission properties of the EPRD-silica system are improved in accordance with the invention by means of various chemical additives which are used to optimize said properties, i.e. color and optical clarity, with the strength properties of the rubber. Thus, satisfactory levels of color, optical transparency, and strength properties are attained in a single rubber material.

EPRD, a clear rubber, requires added filler to develop strength. With EPRD, a silica filler yields stock more nearly transparent than other fillers. Even though the medium is heterogeneous (solid particle filler in liquid rubber), matching of refractive indexes makes it possible to approach optical homogeneity. In EPRD, silica at a level of twenty parts per one hundred of rubber approaches transparency. Among silicas, fumed silica gives a transparency superior to that of precipitation-made mateiral. Fumed silica is preferred, therefore, as a filler for transparent EPRD.

However, when EPRD and silica are combined and hot-pressed, a discoloration results. The cause of the deleterious effect may be extraneous chemicals, residues from monomers, catalyst or in-process treatment. The added presence of the chemicals disclosed by this invention mitigates this discoloration and, also, improves the optical clarity of EPRD-silica stocks.

The types of chemical which have been found to be useful and effective for improving the light transmission characteristics of silica-filled EPRD compositions in accordance with the invention are:

(1) Zinc salts of long chain organic acids, particularly the carboxylic acids containing at least 6 carbon atoms, usually 8 to 20 or more carbon atoms, as in such fatty acids as 2-ethylhexanoic, palmitic, stearic arachidic or undecylic acid, or the corresponding ethylenically unsaturated acids, such as oleic, linoleic, linolenic, ricinoleic or undecylenic acid.

(2) Alkanolamines, including mono-, di- and trialkanolamines, like ethanolamine, diethanolamine and triethanolamine, in which category we include equivalent substituted alkanolamines and alkyl substituted and/or amino substituted forms thereof (e.g., methyl ethanolamine, dimethyl ethanolamine, amino ethyl ethanolamine, N-acetylethanolamine, diisopropanolamine, diethylethanolamine, N-methyldiethanolamine, as well as corresponding higher alkanolamines such as triisopropanolamine, and other substituted forms such as 1-hydroxyethyl 2-heptadecenyl imidazoline. Particularly effective are zinc salts of organic salts of organic acids as in (1) combined with alkanolamines or the like as in (2).

(3) Organic acids, particularly polycarboxylic acids, especially saturated dicarboxylic acids, and tricarboxylic acids such as oxalic, malonic, succinic, citric, aconitic, itaconic, citriconic and salicylic and equivalent acids such as dodecenyl succinic acid, notably in combination with alkanolamines, heretofore defined.

(4) Epoxidized compounds such as soybean oil, castor oil and polybutadiene. The oxidation procedure for epoxidizing the polymeric material followed by treatment with acidic reagents is fully described in U.S. 2,829,135, dated April 1, 1958. The same process is used in epoxidizing the monomeric oils.

(5) Hydroxyl terminated polybutadienes as disclosed in U.S. Patent 3,055,952 issued September 25, 1962.

(6) Glycols and polyoxyethylene compounds. This category includes monoethers of polyglycols with long-chain fatty alcohols, such as reaction products of ethylene oxide or polyethylene glycol with a long-chain (e.g. 8 to 18 carbon atoms) fatty alcohol, e.g. reaction product of ethylene oxide (e.g. 5 to 30 moles) and oleyl alcohol or equivalent as represented by such commercially available materials as Emulphor ON-870. Likewise included are monoesters of polyglycols with long-chain fatty acids (e.g. $C_8$ to $C_{18}$), such as reaction products of ethylene oxide or polyethylene glycol with a long-chain fatty acid, e.g. reaction product of ethylene oxide (e.g. 5 to 30 moles) with oleic acid. Also included are the monoethers of polyglycols with alkylated phenols, such as reaction products of ethylene oxide or polyethylene glycol with alkylated phenols, such as reaction products of ethylene oxide or polyethylene glycol with an alkyl (e.g. $C_6$ to $C_{12}$) phenol, e.g. reaction product of ethylene oxide and octyl phenol or equivalent as represented by such commercially available materials as Carboxane NO (oil soluble) and Carboxane NW (water soluble); such products made with up to 7 moles of ethylene oxide are usually oil soluble while products made with more than 7 moles (e.g. 8–30 moles) of ethylene oxide are usually water soluble; also in this category is nonyl phenoxy poly(ethylenoxy)ethanol as represented by such commercially available materials as Igepal CO-210.

In many cases, as will be apparent from the examples below, improved results are obtained with various combinations of the foregoing additives.

It is postulated that these chemical agents function by:
(1) Adsorption onto the surface of silica, thereby wetting-out the filler more efficiently.
(2) Neutralizing acidic sites on the surface of filler with base or by ion exchange.
(3) Preventing the catalysis of oxidation reactions by the acidic silica surface.
(4) Displacing air from the surface of silica filler.

Surprisingly small amounts of the described chemical additives are sufficient to show appreciable improvement in the light transmission qualities of the EPRD-silica composition. Thus, in many cases as little as one-half part or less of the additive chemical, per 100 parts by weight of EPRD, may be sufficient to produce noticeable improvement, but usually it is found preferable to use a somewhat larger quantity, say 2 to 10 parts. Although considerably larger quantities (e.g. 15 parts or more) may if desired be used in some cases, there is frequently no proportionate added advantage in so doing. In general, it may be said that the optimum quantity in any given case will depend on the degree of transparency desired, the particular chemical additive employed, the kind of EPRD and the amount of silica filler, as well as the nature and quantity of other ingredients present.

The EPRD employed is of course a conventional material, and may be defined as a copolymer of at least two different monoolefins (usually ethylene and propylene although other pairs of monoolefins may be employed) with a small amount of at least one copolymerizable multiolefin. Usually the multiolefin contains from 5 to 22 carbon atoms and has two double bonds separated by more than two carbon atoms. The multiolefin ordinarily comprises from about 1 to not greater than about 20 mol percent of the interpolymer and the ethylene and propylene units are present in ratios from about 1:4 to about 3:1. Examples of suitable multiolefins are straight or branched chain diolefins, such as those in which both double bonds are terminal as in 1,4-pentadiene, 1,5-hexadiene (biallyl), 2-methyl-1,5-hexadiene, 3,3-dimethyl-1, 5-hexadiene, 1,7-octadiene, 1,9-decadiene, 1,19-eicosadiene, and the like; diolefins in which only one double bond is terminal such as 1,4-hexadiene, 1,9-octadecadiene. 6-methyl-1, 5-heptadiene, 7-methyl-1, 6-octadiene, 11-ethyl-1, 11-tridecadiene, and similar compounds in which the internal double bond is shielded. Also suitable are the bridged-ring hydrocarbons of similar nature including endocyclic hydrocarbons containing 7 to 10 carbon atoms and two double bonds, especially those containing a methane or an ethane bridge, for example: (a) unsaturated derivatives of bicyclo[2,2,1] heptane containing at least two double bonds, including bicyclo[2,2,1]hepta-2,5-diene; dicyclopentadiene (also named 3a,4,7a - tetrahydro - 4,7 - methanoidene), tricyclopentadiene, and tetracyclopentadiene; (b) unsaturated derivatives of bicyclo[2,2,2]octane containing at least two double bonds, including bicyclo[2,2,2]octa-2,5-diene; (c) unsaturated derivatives of bicyclo[3,2,1]octane containing at least two double bonds; (d) unsaturated derivatives of bicyclo[3,3,1]nonane containing at least two double bonds; (e) unsaturated derivatives of bicyclo[3,2,2]nonane containing at least two double bonds, and the like. Preferred are dicyclopentadiene, 1,4-hexadiene, and methylene norbornylene.

The silica filler with which the EPRD is combined in practicing the invention may be any conventional fine partcle of size silica conventionally used as a reinforcing filler in elastomers. A preferred form of silica for use in the invention is that known as "fumed silica," a silicon dioxide prepared by vapor flame hydrolysis in known manner. The silica is used in conventional amounts, usually 10 to 60 parts per 100 parts by weight of EPRD.

The invention contemplates the "cure" or "vulcanization" of the composition comprising EPRD, silica, an additive of the kind described, by the action of a conventional peroxidic curative. It is surprisingly found that such a peroxide cure produces excellent results in the described combination, from the color and clarity point of view, whereas other type curing systems adversely affect these properties. The curative employed may be any conventional organic peroxide, among which may be mentioned by way of non-limiting example such compounds as dicumyl peroxide, di-tert-butyl peroxide, tert-butyl cumyl peroxide, 2,5-dimethyl-2,5-di(t-butyl peroxy) hexane, benzoyl peroxide, lauroyl peroxide, tetraline peroxide, urea peroxide, butyryl peroxide, tert-butyl-perbenzoate, and the like (see for example, U.S. Patent 3,041,321, Youngman, June 26, 1962). The peroxide is used in conventional amounts (see the Youngman patent; broadly from 0.1 to about 10 parts, preferably 1 to 5 parts). The curing conditions are of course conventional.

In general, the chemicals may be added to the EPRD before or after adding the filler. Antioxidant may be added as desired for the prevention of tackiness in the stock.

The following examples, in which all quantities are expressed by weight unless otherwise indicated, will serve to illustrate the practice of the invention in more detail. In the examples, three different EPRD rubbers were used, as follows:

EPRD Rubber A.—Terpolymer composition, 50.50% ethylene, 46.6% propylene, 2.9% dicyclopentadiene, Mooney viscosity 60 (ML–4–212° F.).
EPRD Rubber B.—Composition, 55.6% ethylene, 41.5% propylene, 2.9% dicyclopentadiene, viscosity 140 (ML–4–212° F.).
EPRD Rubber C.—60.6% ethylene, 37.2% propylene, 2.2% dicyclopentadiene, viscosity 118 (ML–4–212° F.).

Example 1

In this example, and in all examples to follow, the chemicals were added to the EPRD by means of a conventional, two roll mixing mill. The standard compounding procedure used was: (a) band the EPRD on the mill for three minutes, (b) add the chemical to the rubber and mix for 3 minutes, (c) add the filler and mix for 10 minutes, and (d) add the peroxide curing agent and mix for an additional 3 minutes.

The fully compounded stock was pressed in chrome plated steel molds (ASTM Chelsea) with polyester foil liner on the rubber surfaces. In examples 1 through 5 the stocks were cured for 30 minutes at 320° F. In examples 6 through 8 the stocks were cured 40 minutes at 340° F. After curing, the polyester film was peeled off. The molded material was subsequently measured for percent light transmission, tensile strength, and percent elongation. These data were then compared against similar measurements for a "blank" compound (no chemical addition).

The percent light transmission was for light of wave length 415 millimicrons, and band width 20 millimicrons. The measurement was made in a photoelectric colorimeter. The colorimeter was set at transmission 100% with the cell empty, then the decrease was observed when the rubber sample was placed in the light path. Of course, the highest possible percent light transmission is desired.

The tensile strength and percent elongation were determined from the stress-strain curve of a ring sample stretched uniformly to failure. This test is a standard rubber test entitled "Tension Testing of Vulcanized Rubber," ASTM D412–51T to be found in ASTM Standards on Rubber Products, 1958, at p. 217.

The results obtained using various zinc salts of fatty acids, are shown in Table I. In stocks A, B and C, the EPRD employed was that identified as rubber A, above; in the other stocks, rubber B was used.

TABLE I

| Stock | A | B | C | D | E | F | G | H | I |
|---|---|---|---|---|---|---|---|---|---|
| EPRD | 100 | 100 | 100 | 100 | 100 | 100 | 100 | 100 | 100 |
| Fumed Silica [1] | | 20 | 20 | 20 | 20 | 20 | 20 | 20 | 20 |
| 2,5-dimethyl, 2,5-di (t-butyl peroxy) hexane | 1.0 | 1.0 | 1.0 | | | | | | |
| Di-t-butyl peroxide | | | | 2.0 | 2.0 | 2.0 | 2.0 | 2.0 | 2.0 |
| Zinc di-(2-ethylhexoate) | | | 3.5 | | 3.5 | | | | |
| Zinc laurate | | | | | | 4.6 | | | |
| Zinc oleate | | | | | | | 6.3 | | |
| Zinc stearate | | | | | | | | 6.3 | |
| Zinc Octasol, 8% [2] | | | | | | | | | 8.2 |
| Properties: | | | | | | | | | |
| Light transmission, percent: | | | | | | | | | |
| Green | | | 77 | 53 | 65 | 62 | 69 | 56 | 69 |
| Aged 7 days at 212° F | 75 | 53 | 69 | | | | | | |
| Tensile Strength, p.s.i.: | | | | | | | | | |
| Green | 160 | 1,530 | 950 | 950 | 1,640 | 1,310 | 1,010 | 830 | 1,780 |
| Aged 7 days at 212° F | 160 | 690 | 500 | 950 | 380 | 580 | 380 | 430 | 390 |
| Elongation, percent: | | | | | | | | | |
| Green | 250 | 590 | 570 | 320 | 480 | 430 | 530 | 380 | 630 |
| Aged 7 days at 212° F | 220 | 330 | 360 | 270 | 210 | 240 | 250 | 230 | 270 |

[1] 99.8% silicon dioxide; bulk density 4.5–5.0 lbs./cu. ft.
[2] Zinc di (2-ethylhexoate) in mineral spirits (8% zinc by weight).

As shown by stock B, addition of the silica filler to EPRD causes a large drop in percent light transmission from stock A, EPRD with no filler. However, over two-thirds of this loss is regained by addition of zinc di-(2-ethylhexoate) as is shown by stock C. The stocks used in this comparison were aged for 7 days at 210° F. prior to light transmission measurement.

Stocks E to I illustrate other zinc salts which are operable in the invention, with some of the salts being more effective than others when compared with Stock D.

Example 2

The procedure was the same as in Example 1, except that the additive chemicals were alkanolamines. The results are shown in Table II:

TABLE II

| Stock | J | K | L | M | N | O | P |
|---|---|---|---|---|---|---|---|
| EPRD [1] | 100 | 100 | 100 | 100 | 100 | 100 | 100 |
| Fumed silica | 20 | 20 | 20 | 20 | 20 | 20 | 20 |
| 2,5-dimethyl, 2,5-di(t-butyl peroxy) hexane | 1.0 | 1.0 | 1.0 | 1.0 | 1.0 | 1.0 | 1.0 |
| Diethanolamine | | 1.05 | | | | | |
| Triethanolamine | | | 1.49 | | | | |
| Methyl ethanolamine | | | | .75 | | | |
| Dimethylethanolamine | | | | | .89 | | |
| Triisopropanolamine | | | | | | 1.91 | |
| 1-hydroxyethyl 2-heptadecenyl imidazoline | | | | | | | 3.5 |
| Properties: | | | | | | | |
| Light transmission, percent | 46 | 53 | 53 | 51 | 61 | 61 | 59 |
| Tensile strength, p.s.i.: | | | | | | | |
| Green | 1,470 | 1,140 | 1,640 | 1,460 | | 1,690 | 1,690 |
| Aged 7 days at 212° F | 710 | 1,330 | 1,230 | 1,060 | 720 | 1,560 | 1,680 |
| Elongation, percent: | | | | | | | |
| Green | 490 | 490 | 550 | 500 | | 580 | 630 |
| Aged 7 days at 212° F | 310 | 400 | 390 | 370 | 380 | 500 | 530 |

[1] Rubber A used in stocks J and L; Rubber B used in the remainder of the stocks.

As can be seen from this example, the addition of alkanolamines improves the retention of strength properties of the filled rubber after aging 7 days at 212° F. Light transmission properties are also improved, see particularly the color and optical clarity characteristics of samples O and P.

Example 3

The same procedure as described in Example 1 is followed and demonstrates the effectiveness of zinc salts of carboxylic acids (Table I) in combination with alkanolamines (Table II) on the light transmission properties of silica-filled EPRD stocks.

TABLE III

| Stock | Q | R | S | T | U | V |
|---|---|---|---|---|---|---|
| EPRD [1] | 100 | 100 | 100 | 100 | 100 | 100 |
| Fumed silica | 20 | 20 | 20 | 20 | 20 | 20 |
| 2,5-dimethyl, 2,5-di (t-butyl peroxy) hexane | 1.5 | 1.5 | 1.5 | 1.0 | 1.0 | 1.0 |
| 2,2'-methylene bis (4-methyl-6-t-butylphenol) | | | | .1 | .1 | .1 |
| Zinc Octasol, 8% [2] | 8.2 | 8.2 | | | | |
| Dimethyl ethanolamine | | 1.8 | | | | |
| Zinc laurate | | | | | 2.3 | 2.3 |
| Triisopropanolamine | | | | | | 1.0 |
| Properties: | | | | | | |
| Light Transmission, percent | 50 | 67 | 61 | 47 | 55 | 63 |
| Tensile strength, p.s.i.: | | | | | | |
| Green | 1,020 | 1,120 | 1,000 | 840 | 1,690 | 1,460 |
| Aged 7 days at 212° F | 500 | 320 | 1,610 | 1,450 | 1,290 | 1,520 |
| Elongation, percent: | | | | | | |
| Green | 440 | 550 | 620 | 420 | 540 | 580 |
| Aged 7 days at 212° F | 210 | 170 | 600 | 450 | 450 | 530 |

[1] Rubber A used in stocks Q and R. Rubber B used in the remainder of stocks.
[2] Zinc di (2-ethylhexoate) in mineral spirits (8% zinc by weight).

Several advantages result when zinc salts and alkanolamines are used together in EPRD-silica stocks. Color is lighter than with the alkanolamine alone and the odor of amine is reduced. Further, the aged physical properties are significantly better.

Addition of zinc laurate (Stock U) improves color. Added triisopropanolamine (Stock V) improves the color still more.

Example 4

TABLE IV.—CARBOXYLIC ACIDS IN COMBINATION WITH ALKANOLAMINES

| Stock | W | X | Y | Z | AA |
|---|---|---|---|---|---|
| EPRD (Rubber B) | 100 | 100 | 100 | 100 | 100 |
| Fumed silica | 20 | 20 | 20 | 20 | 20 |
| 2,5-dimethyl, 2,5 di (t-butylperoxy) hexane | 1.0 | 1.0 | 1.0 | 1.0 | 1.0 |
| Triisopropanolamine, (moles) | | .01 | .01 | | .005 |
| Malonic acid, moles | | | .005 | | |
| Dodecenyl succinic acid, moles | | | | .005 | .005 |
| Properties: | | | | | |
| Light transmission, percent | 46 | 61 | 66 | 61 | 69 |
| Tensile strength, p.s.i.: | | | | | |
| Green | 1,470 | 1,690 | 1,590 | 1,560 | 1,540 |
| Aged 7 days at 212° F | 710 | 1,560 | 1,330 | 680 | 650 |
| Elongation, percent: | | | | | |
| Green | 490 | 580 | 610 | 510 | 480 |
| Aged 7 days at 212° F | 310 | 500 | 500 | 190 | 280 |

Addition of triisopropanolamine to a silica-filled EPRD stock improves the color of the stock as well as the light transmission properties (stock X vs. stock W). Addition of a saturated dicarboxylic acid to an amine containing stock (stocks Y and AA) result in further improvements in transparency besides eliminating the characteristic amine odor by converting the amine to a salt during the process.

Example 5

This example demonstrates the practice of the invention with monomeric and polymeric epoxy compounds, as set forth in Table V, below.

Epoxidized oils and epoxidized polybutadiene are shown to be effective in decreasing color and improving clarity in the above examples. In every case the stocks with added epoxy compound had significantly higher values of percent light transmission. Use of a larger amount of epoxy compound, i.e. increasing from 2.5 parts to 5 parts (Stocks AD, AF, AH and AJ) does not improve the light transmission properties compared with similar stocks containing only 2.5 parts of the epoxy compound (Stocks AC, AE, AG and AI).

Additional antioxidant was used with the epoxy compounds. This is desirable both for physical properties and for satisfactory heat aging. Also, if the elastomer is not well protected, a surface stickiness develops after heat aging.

TABLE V.—MONOMERIC AND POLYMERIC EPOXY COMPOUNDS

| Stock | AB | AC | AD | AE | AF | AG | AH | AI | AJ | AK |
|---|---|---|---|---|---|---|---|---|---|---|
| EPRD (Rubber B) | 100 | 100 | 100 | 100 | 100 | 100 | 100 | 100 | 100 | 100 |
| Fumed silica | 20 | 20 | 20 | 20 | 20 | 20 | 20 | 20 | 20 | 20 |
| 2,5 dimethyl, 2,5 di (t-butyl-peroxy) hexane | 1.0 | 1.0 | 1.0 | 1.0 | 1.0 | 1.0 | 1.0 | 1.0 | 1.0 | 1.0 |
| 2,2′-methylene bis-(4-methyl-6-t-butyl-phenol) | 0.1 | 0.1 | 0.1 | 0.1 | 0.1 | 0.1 | 0.1 | 0.1 | 0.1 | 0.1 |
| Epoxidized castor oil [1] | | | | 2.5 | 5.0 | | | | | |
| Partially epoxidized castor oil [2] | | | | | | | | 2.5 | 5.0 | |
| Epoxidized soybean oil [3] | | | | | | 2.5 | 5.0 | | | |
| Epoxidized polybutadiene [4] | | 2.5 | 5.0 | | | | | | | 3.0 |
| Properties: | | | | | | | | | | |
| Light transmission, percent | 49 | 69 | 67 | 68 | 66 | 69 | 67 | 69 | 68 | 72 |
| Tensile strength, p.s.i.: | | | | | | | | | | |
| Green | 1,750 | 1,280 | 1,300 | 1,520 | 830 | 1,420 | 1,420 | 1,580 | 1,490 | 1,150 |
| Aged 7 days at 212° F | 1,450 | 1,390 | 1,590 | 1,410 | 1,380 | 1,310 | 1,080 | 1,910 | 1,210 | 1,090 |
| Elongation, percent: | | | | | | | | | | |
| Green | 490 | 380 | 380 | 480 | 390 | 470 | 480 | 590 | 610 | 360 |
| Aged 7 days at 212° F | 490 | 380 | 400 | 420 | 480 | 400 | 400 | 540 | 490 | 340 |

[1] A monomeric epoxy compound characterized by a color, Gardner 1953 value of 1, acid value 0.3, specific gravity 25° C./25° C., 0.995, saponification value 179, and oxirane oxygen 7%.
[2] Similar to (1) characterized by a color, Gardner 1953 value of 2, acid value 0.5, specific gravity 25° C./25° C., 0.998, saponification value 170, and oxirane oxygen 2%.
[3] A monomeric epoxy compound characterized by a mol. wt. (approx.) 1,000, specific gravity 20° C./20° C., 0.9977, and pour point 25.0° F.
[4] A polymeric epoxy compound having a sp. gr. 1.010, Epoxy percent=9 and iodine number 185.

Example 6

TABLE VI.—HYDROXY TERMINATED POLYBUTADIENE

| Stock | AL | AM | AN | AO | AP |
|---|---|---|---|---|---|
| EPRD (Rubber C) | 100 | 100 | 100 | 100 | 100 |
| Fumed silica | 20 | 20 | 20 | 20 | 20 |
| 2,5 dimethyl, 2,5 di (t-butylperoxy) hexane | 1.0 | 1.0 | 1.0 | 1.0 | 1.0 |
| Hydroxyl terminated polybutadiene [1] | | 2.5 | 5.0 | 2.5 | 2.5 |
| Epoxidized polybutadiene [2] | | | | 2.0 | 2.0 |
| Mineral oil | | | | | 10.0 |
| Properties: | | | | | |
| Light transmission, percent | 42 | 67 | 67 | 75 | 75 |
| Tensile strength, p.s.i.: | | | | | |
| Green | 1,400 | 1,040 | 1,790 | 1,310 | 1,730 |
| Aged 7 days at 212° F | 2,150 | 1,840 | 2,060 | 1,120 | 1,210 |
| Elongation, percent: | | | | | |
| Green | 740 | 450 | 530 | 390 | 560 |
| Aged 7 days at 212° F | 710 | 510 | 520 | 370 | 490 |

[1] Hydroxyl equivalent weight of 1,130 and an Iodine number of 450-460.
[2] Refer to respective remarks under table V, Example 5.

As shown in this example, the addition of hydroxyl terminated polybutadiene to a silica-filled EPRD stock improves the percent light transmission, see stocks AM and AN. However there are no advantages to be gained with respect to light transmission properties by using more than 2.5 parts of the chemical. Epoxidized polybutadiene used in combination with hydroxyl terminated polybutadiene confers even better light transmission properties, see stocks AO and AP.

Example 7

TABLE VII.—GLYCOLS AND POLYOXYETHYLENE COMPOUNDS

| Stock | AQ | AR | AS | AT | AU | AV | AW | AX | AY |
|---|---|---|---|---|---|---|---|---|---|
| EPRD (Rubber C) | 100 | 100 | 100 | 100 | 100 | 100 | 100 | 100 | 100 |
| Fumed silica | 20 | 20 | 20 | 20 | 20 | 20 | 20 | 20 | 20 |
| 2,5 dimethyl, 2,5 di (t-butylperoxy) hexane | 1.0 | 1.0 | 1.0 | 1.0 | 1.0 | 1.0 | 1.0 | 1.0 | 1.0 |
| Ethylene glycol [1] | | 1.24 | | | | | | | |
| Diethylene glycol | | | 2.12 | | | | | | |
| Triethylene glycol | | | | 3.0 | | | | | |
| Polypropylene glycol 2025 | | | | | 2.0 | | | | |
| Alkyl phenol ethoxylate, oil soluble [2] | | | | | | 2.0 | | | |
| Alkyl phenol ethoxylate, water soluble [2] | | | | | | | 2.0 | | |
| Nonyl phenoxy poly (ethyleneoxy) ethanol [3] | | | | | | | | 2.0 | |
| Polyoxyethylated fatty alcohol [4] | | | | | | | | | 2.0 |
| Properties: | | | | | | | | | |
| Light transmission, percent | 37 | 50 | 56 | 53 | 61 | 65 | 63 | 59 | 69 |
| Tensile strength, p.s.i.: | | | | | | | | | |
| Green | 1,520 | 1,540 | 1,440 | 1,690 | 1,500 | 1,840 | 990 | 1,710 | 1,730 |
| Aged 7 days at 212° F | 1,850 | 1,640 | 1,690 | 1,930 | 2,150 | 1,870 | 1,400 | 2,040 | 1,840 |
| Elongation, percent: | | | | | | | | | |
| Green | 660 | 690 | 730 | 740 | 620 | 650 | 570 | 680 | 640 |
| Aged 7 days at 212° F | 610 | 540 | 570 | 600 | 620 | 620 | 580 | 650 | 600 |

[1] The properties of the glycols used in Example 7 are disclosed on pages 10 and 11 of the 1965 edition of "Physical Properties—Synthetic Organic Chemicals" published by Union Carbide Corporation, Chemical Division.
[2] and (3) Marketed as Carboxane NO and Carboxane NW respectively.
[3] Marketed as Igepal CO-210.
[4] Marketed as Emulphor ON-870.

This example shows the advantageous effect of glycols and polyoxyethylene compounds on silica filled EPRD.

Example 8

All examples shown so far have contained 20 parts silica per 100 parts of EPRD. This example shows the effect of increased silica loadings on the resultant product.

60 parts and the amount of the acid being from ½ to 15 parts, per 100 parts by weight of the rubber.

7. A vulcanizate characterized by improved light transmission obtained by curing a composition comprising an ethylene-propylene-nonconjugated copolymerizable diene terpolymer rubber, silica filler, epoxidized material selected from the group consisting of epoxidized soybean

TABLE VIII

| Stock | AZ | BA | BB | BC | BD | BE | BF | BG | BH | BI |
|---|---|---|---|---|---|---|---|---|---|---|
| EPRD (Rubber C) | 100 | 100 | 100 | 100 | 100 | 100 | 100 | 100 | 100 | 100 |
| Fumed silica | 20 | 30 | 40 | 50 | 60 | 50 | 50 | 50 | 50 | 50 |
| 2,5-dimethyl, 2,5-di (t-butyl peroxy) hexane | 1.0 | 1.0 | 1.0 | 1.0 | 1.0 | 1.0 | 1.0 | 1.0 | 1.0 | 1.0 |
| Hydroxyl terminated polybutadiene | | | | | | | | | 10.1 | 10.1 |
| Epoxidized polybutadiene | 2.0 | 2.0 | 2.0 | 2.0 | 2.0 | 2.0 | 5.0 | 5.0 | 2.0 | 5.0 |
| Mineral oil | | | | | | 10.0 | 10.0 | | | |
| Properties: | | | | | | | | | | |
| Light transmission, percent | 73 | 69 | 67 | 59 | 59 | 63 | 73 | 73 | 71 | 68 |
| Tensile strength, p.s.i.: | | | | | | | | | | |
| Green | 1,360 | 2,180 | 2,990 | 2,790 | 2,540 | 2,500 | 2,930 | 2,470 | 2,650 | 2,830 |
| Aged 7 days at 212° F | 1,860 | 1,980 | 3,730 | 2,980 | 2,470 | 2,700 | 2,800 | 3,040 | 3,130 | 2,950 |
| Elongation, percent: | | | | | | | | | | |
| Green | 450 | 420 | 510 | 470 | 440 | 560 | 470 | 330 | 480 | 390 |
| Aged 7 days at 212° F | 480 | 380 | 510 | 430 | 370 | 490 | 420 | 330 | 440 | 360 |

Having thus described my invention, what I claim and desire to protect by Letters Patent is:

1. A vulcanizate characterized by improved light transmission obtained by curing a composition comprising an ethylene-propylene-nonconjugated copolymerizable diene terpolymer rubber, silica filler, a peroxide curative for the rubber, and at least one additive selected from the group consisting of
   (1) zinc salts of organic carboxylic acids having at least 6 carbon atoms,
   (2) alkanolamines,
   (3) organic aliphatic polycarboxylic acids,
   (4) epoxidized soybean oil, epoxidized castor oil, epoxidized polybutadiene,
   (5) hydroxyl terminated polybutadiene,
   (6) glycols and polyoxethylene compounds,
the amount of silica filler being from 10 to 60 parts, and the amount of said additive being from ½ to 15 parts, per 100 parts by weight of the rubber.

2. A vulcanizate as in claim 1, in which the said diene is dicyclopentadiene.

3. A vulcanizate characterized by improved light transmission obtained by curing a composition comprising an ethylene-propylene-nonconjugated copolymerizable diene terpolymer rubber, silica filler, a zinc salt of an organic carboxylic acid having at least 6 carbon atoms, and an organic peroxide curative for the rubber, the amount of silica filler being from 10 to 60 parts, and the amount of the zinc salt being from ½ to 15 parts, per 100 parts by weight of the rubber.

4. A vulcanizate characterized by improved light transmission obtained by curing a composition comprising an ethylene-propylene-nonconjugated copolymerizable diene terpolymer rubber, silica filler, an alkanolamine, and an organic peroxide curative for rubber, the amount of silica filler being from 10 to 60 parts, and the amount of alkanolamine being from ½ to 15 parts, per 100 parts by weight of the rubber.

5. A vulcanizate characterized by improved light transmission obtained by curing a composition comprising an ethylene-propylene-nonconjugated copolymerizable diene terpolymer rubber, silica filler, a zinc salt of an organic carboxylic acid having at least 6 carbon atoms, and alkanolamine, and an organic peroxide curative for the rubber, the amount of silica filler being from 10 to 60 parts, and the amount of the zinc salt plus alkanolamine being from ½ to 15 parts, per 100 parts by weight of the rubber.

6. A vulcanizate characterized by improved light transmission obtained by curing a composition comprising an ethylene-propylene-nonconjugated copolymerizable diene terpolymer rubber, silica filler, an organic aliphatic polycarboxylic acid, and an organic peroxide curative for the rubber, the amount of silica filler being from 10 to 60 parts and the amount of the acid being from ½ to 15 parts, per 100 parts by weight of the rubber.

oil, epoxidized castor oil, and epoxidized polybutadiene, and an organic peroxide curative for the rubber, the amount of silica filler being from 10 to 60 parts, and the amount of the epoxidized material being from ½ to 15 parts, per 100 parts by weight of the rubber.

8. A vulcanizate characterized by improved light transmission obtained by curing a composition comprising an ethylene-propylene-nonconjugated copolymerizable diene terpolymer rubber, silica filler, hydroxyl terminated polybutadiene, and an organic peroxide curative of the rubber, the amount of silica filler being from 10 to 60 parts, and the amount of hydroxyl terminated polybutadiene being from ½ to 15 parts, per 100 parts by weight of the rubber.

9. A vulcanizate characterized by improved light transmission obtained by curing a composition comprising an ethylene-propylene-nonconjugated copolymerizable diene terpolymer rubber, silica filler, a glycol selected from the group consisting of ethylene glycol, diethylene glycol, triethylene glycol and polypropylene glycol, and an organic peroxide curative for the rubber, the amount of silica filler being from 10 to 60 parts, and the amount of glycol being from ½ to 15 parts, per 100 parts by weight of the rubber.

10. A vulcanizate characterized by improved light transmission obtained by curing a composition comprising an ethylene-propylene-nonconjugated copolymerizable diene terpolymer rubber, silica filler, a polyoxyethylene compound selected from the group consisting of ethylene oxide-alkyl phenol reaction products in which the alkyl group has from 6 to 12 carbon atoms, and ethylene oxide fatty alcohol reaction products in which the fatty alcohol has from 8 to 18 carbon atoms, and an organic peroxide curative for the rubber, the amount of silica filler being from 10 to 60 parts, and the amount of polyoxyethylene compound being from ½ to 15 parts, per 100 parts by weight of the rubber.

11. A vulcanizate characterized by improved light transmission obtained by curing a composition comprising an ethylene-propylene-nonconjugated copolymerizable diene terpolymer rubber, silica filler, hydroxyl terminated polybutadiene, and epoxidized material selected from the group consisting of epoxidized soybean oil, epoxidized castor oil, and epoxidized polybutadiene, and an organic peroxide curative for the rubber, the amount of silica filler being from 10 to 60 parts, and the amount of hydroxyl terminated polybutadiene plus epoxidized material being from ½ to 15 parts, per 100 parts by weight of the rubber.

12. A vulcanizate characterized by improved light transmission obtained by curing a composition comprising an ethylene-propylene-nonconjugated copolymerizable diene terpolymer rubber, silica filler, an organic aliphatic polycarboxylic acid, an alkanolamine, and an organic peroxide curative for the rubber, the amount of silica filler being from 10 to 60 parts, and the amount of said acid plus alkanolamine being from ½ to 15 parts, per 100 parts by weight of the rubber.

References Cited

UNITED STATES PATENTS

| 3,033,835 | 5/1962 | Adamek et al. | 260—79.5 |
| 3,141,004 | 7/1964 | Wolf | 260—41.5 |
| 3,156,666 | 11/1964 | Pruett | 260—41 |
| 3,261,888 | 7/1966 | Cornell et al. | 260—877 |
| 3,322,852 | 5/1967 | Trimentozzi | 260—837 |

OTHER REFERENCES

Du Pont Development Products Reports No. 18, December 1961, pp. 3, 4, 6 and 8.

Compounding Ingredients for Rubber, 3rd ed., 1961, p. 90.

DONALD E. CZAJA, *Primary Examiner.*

R. A. WHITE, *Assistant Examiner.*